United States Patent
Shigemori

(10) Patent No.: US 6,400,673 B1
(45) Date of Patent: Jun. 4, 2002

(54) OPTICAL DISK DRIVE

(75) Inventor: Toshihiro Shigemori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/212,599

(22) Filed: Dec. 16, 1998

(30) Foreign Application Priority Data

Dec. 19, 1997 (JP) ............................................. 9-365081

(51) Int. Cl.[7] .................................................. G11B 7/00
(52) U.S. Cl. ................... 369/116; 369/59.11; 369/53.26
(58) Field of Search ................................. 369/116, 121, 369/124.01, 122, 99, 44.26, 44.29, 44.41, 53.26, 59.11, 59.12; 372/38, 33, 39, 31

(56) References Cited

U.S. PATENT DOCUMENTS

| | | | | |
|---|---|---|---|---|
| 4,935,915 A | * | 6/1990 | Fujiwara et al. | 369/116 |
| 5,255,007 A | * | 10/1993 | Bakx | 369/116 |
| 5,276,671 A | * | 1/1994 | Minami et al. | 369/116 |
| 5,568,464 A | * | 10/1996 | Horie | 369/116 |
| 5,648,952 A | * | 7/1997 | Maegawa et al. | 369/116 |
| 5,946,334 A | * | 8/1999 | Ema et al. | 372/38 |

FOREIGN PATENT DOCUMENTS

| | | |
|---|---|---|
| JP | 1-119921 | 5/1997 |
| JP | 9-171631 | 6/1997 |
| JP | 9-288840 | 11/1997 |
| JP | 63-266632 | 11/1998 |

* cited by examiner

Primary Examiner—David Hudspeth
Assistant Examiner—Kim-Kwok Chu
(74) Attorney, Agent, or Firm—Dickstein Shapiro Morin & Oshinsky LLP

(57) ABSTRACT

A first current flows through a laser diode, a second current flows through the laser diode in addition to the first current, and a third current flows through the laser diode in addition to the first and second currents. First and second switches allow the second and third currents to be provided to the laser diode and prevent the second and third currents from being provided to the laser diode. First and second pulse generators provide first and second on-off signals each having a pulse-series waveform to the first and second switches in accordance with an information code. A timing unit generates a timing signal for preventing the first and second on-off signals from being provided to the first and second switches. Output of a photo detector is sampled during a period during which the timing signal is generated, and is sampled during a period during which the first on-off signal is in an H level and the second on-off signal is in an L level. The first and second currents are adjusted depending on the thus-sampled outputs of the photo detector. The third current is adjusted so as to have the value obtained as a result of the value of the second current being multiplied by a predetermined coefficient.

5 Claims, 9 Drawing Sheets

OPTICAL DISK DRIVE

BACKGROUND OF THE INVENTION

1. Field of the Invention

The present invention relates to an optical disk drive in which recording and erasing of information, and initialization are performed on an optical disk as a result of light having a waveform of pulse series emitted from a light source being applied on the optical disk. The frequency of the pulse series is higher than the frequency of an information code (recording code) which is recorded on the optical disk. In particular, the present invention relates to a laser-power control device for controlling light-emitting power of a semiconductor laser (laser diode) or the like which is the light source of the optical disk drive.

2. Description of the Related Art

Phase-change-type optical disks such as CD-RW (Compact Disks ReWriteable) are disks on which high-density recording can be performed, and recording and erasing of information and initialization are performed on such disks.

Various methods for recording information on such phase-change-type optical disks have been proposed.

For example, as a recording method which is suitable for use in which overwriting of data is performed on a disk, a recording method (disclosed in Japanese Laid-Open Patent Application No. 63-266632) in which a laser beam having a waveform of a single or a plurality of pulses is applied on a disk so that an amorphous mark is formed on the disk, a recording method (disclosed in Japanese Laid-Open Patent Application No. 1-119921) in which a laser beam having a waveform of high-frequency pulse series is applied on a disk so that an amorphous mark is formed on the disk and a portion of the disk is crystallized, and so forth, have been known.

A recording method for phase-change-type optical disks will now be simply described.

FIGS. 1A and 1B illustrate a principle of the recording method for phase-change-type optical disks. FIG. 1A shows relation between an information code and laser power, and FIG. 1B shows a recorded condition, corresponding to the information code, on a track of the disk. In FIG. 1A, Pp represents a amorphous-phase forming level, Pe represents a crystallizing level and Pr represents a reading level.

In a case where such a phase-change-type optical disk is used, when information is recorded on the disk, a laser spot is applied on the disk, and laser power of a laser beam is changed in accordance with an information code. Thereby, crystallized areas and amorphous marks are formed on a recording film of the disk. Thus, information is recorded on the disk.

Specifically, with reference to FIG. 1A, for a '0' level of the information code, the laser power is caused to be in the crystallizing level Pe. Thereby, portions of the recording film of the disk are crystallized, and, thus, the crystallized areas are formed.

In contrast to this, for a '1' level of the information code, the laser power is changed between the amorphous-phase forming level Pp and the reading level Pr so as to have a waveform of pulse series. Thereby, portions of the recording film of the disk enter an amorphous phase, and, thus, amorphous marks are formed there.

Through such a recording operation, as shown in FIG. 1B, amorphous marks are formed for the '1' level of the information code on the track.

As shown in FIG. 1A, Pp (amorphous-phase forming level)>Pe (crystallizing level)>Pr (reading level).

Thus, on the phase-change-type optical disk, the crystallized areas for the '0' level of the information code and the amorphous marks for the '1' level of the information code are formed.

For this purpose, the laser power is controlled to have the three levels, that is, the (middle) crystallizing level Pe for the '0' level of the information code, and the (highest) amorphous-phase forming level Pp and the (lowest) recording level Pr for forming the amorphous marks for the '1' level of the information code.

In an optical disk drive, for phase-change-type optical disks such as CD-RW, in which a laser spot having a waveform of high-frequency pulse series is applied on an optical disk, and thus, recording and erasing of information and initialization are performed on the disk, laser power changes at a high frequency.

Therefore, when an emitted-light-intensity detector having a relatively narrow detection frequency band is used, it is difficult to precisely detect emitted-light intensity.

When emitted-light intensity is adjusted by using such imprecisely detected emitted-light intensity, it is difficult to precisely adjust light intensity, and, thereby, it is difficult to stabilize light intensity.

As a result, there is a case where recording or erasing of information, or initialization is performed incompletely.

When using an emitted-light-intensity detector having a wide detection frequency band, expensive light-receiving device and amplifier are needed, and, thereby, the cost of the optical disk drive increases.

In order to eliminate such problems, the inventor of the present invention proposed (in Japanese Laid-Open Patent Application No. 9-171631) an optical disk drive in which emitted-light intensity of a laser diode is stabilized by using an inexpensive and simple arrangement, and, thereby, information recorded on a disk has high reliability.

A laser-power control device in this optical disk drive provides a period during which a laser diode is driven to emit light which does not have a waveform of pulse series. During the period, emitted-light power is detected, and, by using the detected emitted-light power, emitted-light power is controlled.

As a result of emitted-light power being controlled as mentioned above, it is possible to precisely detect emitted-light intensity even by using an emitted-light-intensity detector having a relatively narrow detection frequency band.

However, in detection of emitted-light intensity of the laser diode, the laser diode emits light of recording power (the above-mentioned amorphous-phase forming level Pp) during the period during which the laser diode is driven to emit light which does not have a waveform of pulse series. When light of such high power is applied to an optical disk and emitted-light power is controlled, the optical disk is degraded. When light of the recording power not having a waveform of pulse series is applied on a phase-change-type optical disk, characteristics of the optical disk are remarkably degraded. As a result, recording, reproducing and erasing of information cannot be performed with high reliability.

In order to eliminate this problem, the inventor of the present invention proposed (in Japanese Laid-Open Patent Application No. 9-288840) a laser-power control device in an optical disk drive. In this laser-power control device, setting of laser power having the crystallizing level (middle level) Pe is performed during a period during which an information code has a '0' level and light not having a waveform of pulse series is applied on an optical disk. Thereby, an optimum additional current Ie for the crystallizing level Pe is obtained. An optimum additional current Ip for the amorphous-phase forming level Pp is obtained as a result of the additional current Ie, detected in the period during which the applied light does not have a waveform of a pulse series, being multiplied by a certain coefficient. A base current Ir for the reading level Pr is obtained as a result of a detection output smoothed through a low-pass filter being used, and, thus, an average power level between the highest amorphous-phase forming level Pp and the lowest reading level Pr being detected.

Thus, emitted-light power is controlled by using the output of the low-pass filter during a period during which light has a waveform of pulse series. Thereby, even by using an emitted-light-intensity detector having a relatively narrow detection frequency band and therefore being inexpensive, precise power control can be performed.

As described above, the laser-power control devices in the optical disk drives, by which, even by using an emitted-light-intensity detector having a relatively narrow detection frequency band and therefore being inexpensive, precise power control can be performed, have been known.

However, in the laser-power control device in the optical disk drive (disclosed in the above-mentioned Japanese Laid-Open Patent Application No. 9-171631) in which the period, during which the laser diode is driven to emit light not having a waveform of pulse series, is provided, emitted-light power of the laser diode during this period is detected, and, thereby, emitted-light power is controlled, and in the laser-power control device in the optical disk drive (disclosed in the above-mentioned Japanese Laid-Open Patent Application No. 9-288840) in which the output of the low-pass filter during the period during which emitted-light power has a waveform of pulse series is detected, and, thereby, emitted-light power is controlled, circuits for detecting emitted-light intensity and precisely controlling emitted-light intensity are somewhat complicated.

SUMMARY OF THE INVENTION

An object of the present invention is to enable stabilization of emitted-light intensity of a laser diode, and also, to enable high-reliability information recording, by using an emitted-light-intensity detector having a relatively narrow detection frequency band and therefore being inexpensive, in an optical disk drive in which a laser spot having a waveform of pulse series having a frequency higher than the frequency of an information code is applied on an optical disk, and, thereby, recording, reproducing, erasing of information and initialization is performed on the optical disk.

An optical disk drive according to the present invention is provided with a light source (a laser diode 1, shown in FIG. 2) and a light-intensity detecting unit (a photo detector 2, an amplifier 3) which detects intensity of light emitted from the light source, and records an information code on an optical disk by applying light, emitted from the light source, having a waveform of pulse series, on the optical disk. The frequency of the pulse series is higher than the frequency of the information code. The optical disk drive comprises, as a laser-power control device:

a current providing unit (an Ir current source 8) which provides a first current (Ir) to the light source;

a first current adding unit (an Ie current source 7) which provides a second current (Ie) to the light source in addition to the first current;

a second current adding unit (an Ip current source 5) which provides a third current (Ip) to the light source in addition to the first current and the second current;

a first switch unit (an Ie switch 6) which allows the second current to be provided to the light source or prevents the second current from being provided to the light source;

a second switch unit (an Ip switch 4) which allows the third current to be provided to the light source or prevents the third current from being provided to the light source;

a first pulse generator (22) which provides a first on-off control signal (SWe) having a waveform of pulse series to the first switch unit in accordance with the information code;

a second pulse generator (23) which provides a second on-off control signal (SWp) having a waveform of pulse series to the second switch unit in accordance with the information code;

a timing unit (a first timing circuit 24, a first AND gate 19, a second AND gate 20) which generates a timing signal (SHr) for preventing the first and second on-off control signals (SWe, SWp) from being provided to the first switch unit and the second switch unit, respectively, during a predetermined period;

a first sample-and-hold unit (a first sample-and-hold circuit 17) which samples and holds output (Vd) of the light-intensity detecting unit during the period during which the timing signal is generated;

a second sample-and-hold unit (a second sample-and-hold circuit 18) which samples and holds the output of the light-intensity detecting unit during a period during which the first on-off control signal is in a first level (H) and the second on-off control signal is in a second level (L);

a first adjusting unit (a first comparator 13, a micro controller 12, a first D-A converter 9) which adjusts the first current depending on output of the first sample-and-hold unit;

a second adjusting unit (a second comparator 14, the micro controller 12, a second D-A converter 10) which adjusts the second current depending on output of the second sample-and-hold unit; and a third adjusting unit (the second comparator 14, the micro controller 12, a third D-A converter 11) which adjusts the third current depending on the output of the second sample-and-hold unit.

In this arrangement, when the laser diode 1 is caused to generate the crystallizing level Pe, the current Ie for the crystallizing level Pe is added to the current Ir for the reading level Pr. When the laser diode 1 is caused to generates the amorphous-phase forming level Pp, the current Ip for the amorphous-phase forming level Pp is added to the current Ir for the reading level Ir and the current Ie for the crystallizing level Pe.

During a period during which the information code is in the '0' level and the laser diode 1 is caused to generate the crystallizing level Pe, the laser power of the laser diode 1 is in the crystallizing level Pe in a condition in which the laser power does not have a waveform of pulse series. Therefore, as a result of the emitted-light-intensity detection voltage Vd being sampled during the period, it is possible to precisely detect the crystallizing level Pe.

Further, the laser power of the laser diode 1 is caused to be in the reading level Pr, in a condition in which the laser power does not have a waveform of pulse series, during the above-mentioned predetermined period, every predetermined time. Therefore, as a result of the emitted-light-intensity detection voltage Vd being sampled during the predetermined period, it is possible to precisely detect the reading level Pr.

Then, based on the precisely detected respective levels (Pe and Pr), the currents Ir and Ie which are provided to the laser diode 1 are adjusted.

Therefore, even in a case where the detection frequency bands of the photo detector 2 and the amplifier 3 are relatively narrow, it is possible to precisely detect the laser power having the crystallizing level Pe and the laser power having the reading level.

As a result, it is possible to precisely adjust the laser power having the crystallizing level Pe and the laser power having the reading level Pr to be in desired levels, respectively. Thereby, it is possible to stabilize the emitted-light intensity, and, thereby, it is possible to improve reliability of information recorded on an optical disk.

The first adjusting unit may compare the level of the output of the first sample-and-hold unit with a first predetermined level (a predetermined voltage Tr output from a fifth D-A converter 16), and control the first current depending on the comparison result; and the second adjusting unit may compare the level of the output of the second sample-and-hold unit with a second predetermined level (a predetermined voltage Te output from a fourth D-A converter 15), and control the second current depending on the comparison result.

The third adjusting unit may control the third current so that the third current has the value obtained as a result of the value of the second current which is controlled by the second adjusting unit being multiplied by a predetermined coefficient.

In this arrangement, the ratio of the third current (the current Ip for the amorphous-phase forming level Pp) to the second current (the current Ie for the crystallizing level Pe) is predetermined to be the value such that a desired amorphous-phase forming level Pp can be obtained by using the value.

In this case, although the laser power having the amorphous-phase forming level Pp is not directly detected, the current Ip obtained as a result of the adjusted current Ie being multiplied by the predetermined coefficient is provided.

As a result, it is further possible to precisely adjust the amorphous-phase forming level Pp to be a desired level.

The second sample-and-hold unit may sample and hold the output of the light-intensity detecting unit during a period during which the first on-off control signal is in the first level and the second on-off control signal is in the second level, which period is longer than a predetermined time.

In this arrangement, because a sampling timing signal SHe is in the 'H' level only in a case where a period during which the '0' level of the information code continues is longer than the predetermined time so that the emitted-light-intensity detection voltage Vd output from the amplifier 3 sufficiently stabilizes, the second sample-and-hold unit 18 can sample the detection voltage corresponding to the crystallizing level Pe.

As a result, the emitted-light-intensity detection voltage Vd is sampled only during the period during which the '0' level of the information code continues and the laser power does not have a waveform of pulse series, which period is longer than the predetermined time. That is, the sampling timing signal is in the 'H' level through the period in which the emitted-light-intensity detection voltage Vd sufficiently stabilizes. As a result, it is possible to detect the crystallizing level Pe further precisely.

The second sample-and-hold unit may sample and hold the output of the light-intensity detecting unit during a period during which the first on-off control signal is in the first level and the second on-off control signal is in the second level, which period is corresponding to the longest inverting time of the information code.

In this arrangement, because the sampling timing signal SHe is in the 'H' level only during a period during which the '0' level of the information code continues, which period is corresponding to the longest inverting interval, so that the emitted-light-intensity detection voltage Vd output from the amplifier 3 sufficiently stabilizes, the second sample-and-hold unit 18 can sample the detection voltage corresponding to the crystallizing level Pe.

As a result, the emitted-light-intensity detection voltage Vd is sampled only during a period during which the '0' level of the information code continues and the laser power does not have a waveform of pulse series, which period is corresponding to the longest inverting interval. That is, the sampling timing signal is in the 'H' level through the period in which the emitted-light-intensity detection voltage Vd sufficiently stabilizes. As a result, it is possible to detect the crystallizing level Pe further precisely.

Other objects and further features of the present invention will become more apparent from the following detailed descriptions when read in conjunction with the accompanying drawings.

DETAILED DESCRIPTION OF THE PREFERRED EMBODIMENTS

A first embodiment of the present invention will now be described.

In the first embodiment, in a simple arrangement using an emitted-light-intensity detector having a relatively narrow detection frequency band and therefore being inexpensive, as a result of emitted-light intensity of a laser diode being stabilized, the three power levels, that is, not only the lowest reading level Pr, but also the middle crystallizing level Pe and the highest amorphous-phase forming level Pp can be precisely set. In the first embodiment, when the laser diode is driven for the crystallizing level Pe, the current Ie for the crystallizing level Pe is added to the current Ir for the reading level Pr, and, when the laser diode is driven for the amorphous-phase forming level Pp, the current Ip for the amorphous-phase forming level Pp is added to the current Ir for the reading level Pr and the current Ie for the crystallizing level Pe.

Specifically, in the first embodiment, in order to enable precise detection of emitted-light for enabling precise control of emitted-light power during a period during which an information code C is '1' and emitted-light power has a waveform of pulse series, a timing signal (SHr shown in FIG. 2) is in an 'H' level for causing an on-off signal (SWe shown in FIG. 2) for the current Ie for the crystallizing level Pe and an on-off signal (SWp shown in FIG. 2) for the current Ip for the amorphous-phase forming level Pp to be in an 'L' level during a predetermined period. Then, during the period during which the timing signal (SHr) is in the 'H' level, an emitted-light-intensity detection voltage (Vd shown in FIG. 2) is held by a first circuit. During a period during which the on-off signal (SWe) for the current Ie is in the 'H' level and the on-off signal (SWp) for the current Ip is in the 'L' level, the emitted-light-intensity detection voltage (Vd) is held by a second circuit.

Then, by using the value of the voltage held in the first circuit, the current Ir for the reading level Pr is adjusted. By using the value of the voltage held in the second circuit, the current Ie for the crystallizing level Pe and the current Ip for the amorphous-phase forming level Pp are adjusted.

Figure 1A:
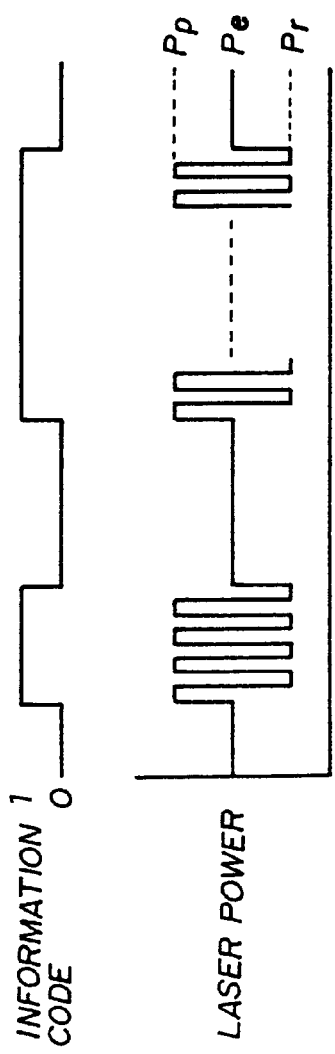
FIGS. 1A and 1B illustrate a principle of a recording method for phase-change-type optical disks.
Figure 1B:
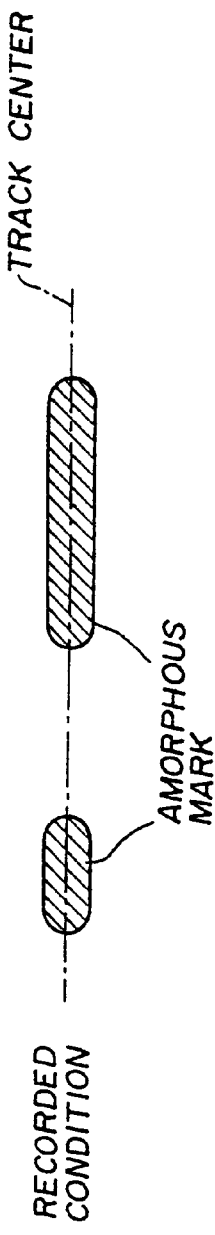
Figure 2:
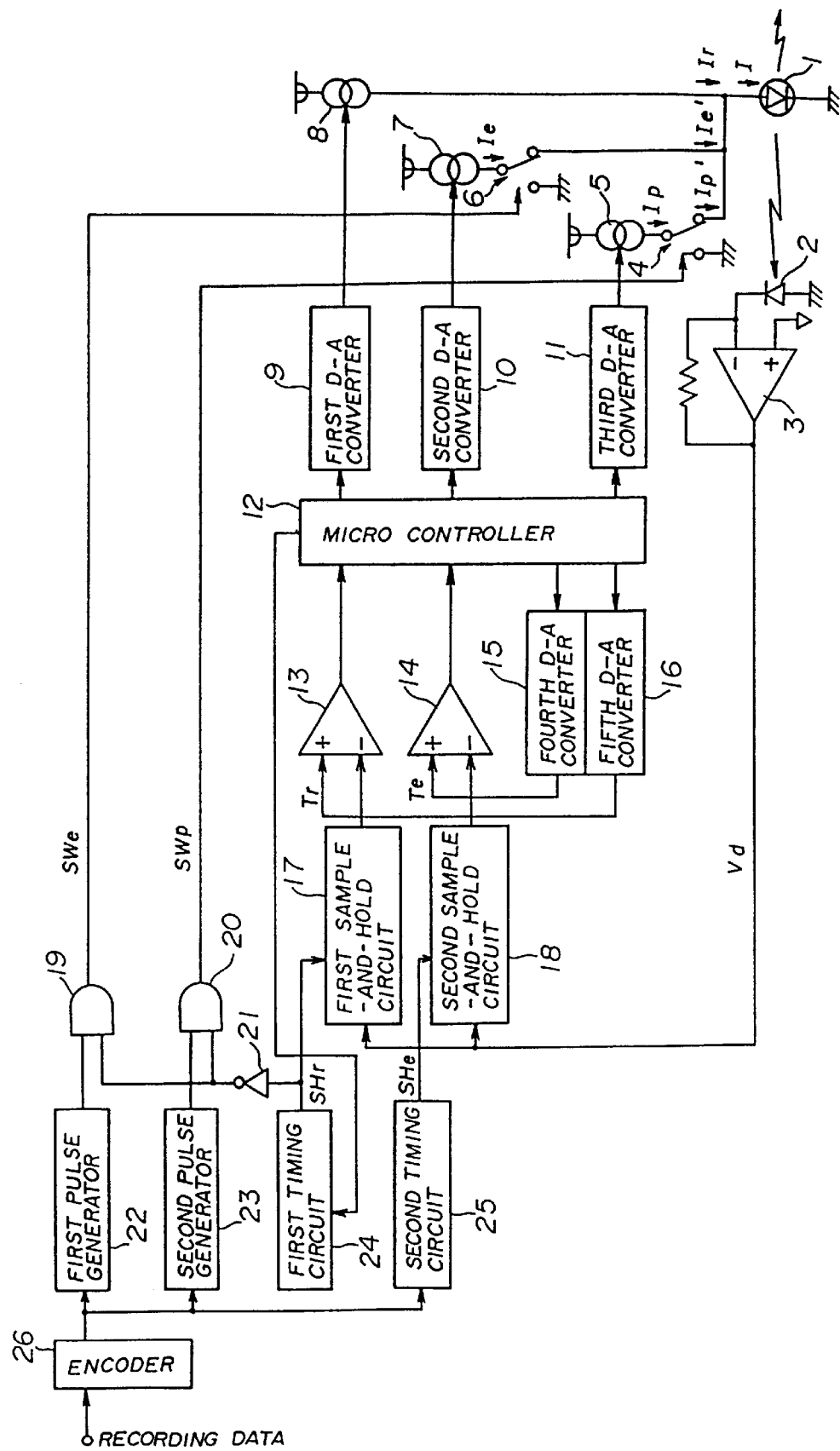
FIG. 2 shows a function block diagram of an essential arrangement of a laser-power control device in an optical disk drive in each of first, second, third, fourth and fifth embodiments according to the present invention.

FIG. 2 shows a function block diagram of an essential arrangement of a laser-power control device in an optical disk drive in the first embodiment according to the present invention. This arrangement includes a laser diode 1, a photo detector 2, an amplifier 3, an Ip switch 4, an Ip current source 5, an Ie switch 6, an Ie current source 7, an Ir current source 8, first, second and third D-A converters 9, 10 and 11, a micro controller 12, first and second comparators 13 and 14, fourth and fifth D-A converters 15 and 16, first and second sample-and-hold circuits 17 and 18, first and second AND gate circuits 19 and 20, an inverter 21, first and second pulse generators 22 and 23, first and second timing circuits 24 and 25, and an encoder 26. A current I actually flows through the laser diode 1. A current Ir is a driving current for causing the laser diode 1 to generate laser power having the reading level Pr. A current Ie is a current which is added to the current Ir so that laser power having the crystallizing level Pe is generated by the laser diode 1. A current Ie' is a current obtained as a result of the current Ie is allowed to flow and prevented from flowing alternately. A current Ip is a current which is added to the current Ir and the current Ie so that laser power having the amorphous-phase forming level Pp is generated by the laser diode 1. A current Ip' is a current obtained as a result of the current Ip is allowed to flow and prevented from flowing alternately. The signal SWe is the on-off control signal for turning on and off the Ie switch 6. The signal SWp is the on-off control signal for turning on and off the Ip switch 4. The timing signal SHr is output from the first timing circuit 24 and is a sampling timing signal for the first sample-and-hold circuit 17. A signal SHe is a sampling timing signal for the second sample-and-hold circuit 18. A voltage Tr is a predetermined voltage output from the fifth D-A converter 16. A voltage Te is a predetermined voltage output from the fourth D-A converter 15. The voltage Vd is the emitted-light-intensity detection voltage output from the amplifier 3.

Light emitted from the laser diode 1 is converged by a lens, not shown in the figure, and is applied on a disk, not shown in the figure. A portion of the emitted light is applied on the photo detector 2, and the output of the photo detector 2 is amplified by the amplifier 3. The output voltage Vd of the amplifier 3 is used for detection of emitted-light intensity.

The currents from the three current sources (Ip current source 5, Ie current source 7 and Ir current source 8) flow through the laser diode 1. Among the currents from the three current sources, the currents from the two current sources (Ip current source 5 and Ie current source 7) are allowed to flow and prevented from flowing by the Ip switch 4 and Ie switch 6, respectively.

The Ir current source 8 causes the current Ir to flow through the laser diode 1, which current is needed for causing the laser diode 1 to generate laser power having the reading level Pr (the lowest level).

When the laser diode 1 is caused to generate laser power having the crystallizing level Pe, only the Ie switch 6 of the two switches (Ip switch 4 and Ie switch 6) is operated. When the Ie switch 6 is turned on, the current Ir from the current source 8 and the current Ie from the current source 7 are caused to flow through the laser diode 1 together.

In this case, the current Ie from the Ie current source 7 is added to the current Ir which causes the laser diode 1 to generate the reading level Pr, and, thus, the current Ir and the current Ie are caused to flow through the laser diode 1 together.

Thus, when the laser diode 1 is caused to generate laser power having the crystallizing level Pe, the current (Ir+Ie) which is needed for causing the laser diode 1 to generate laser power having the crystallizing level Pe is caused to flow through the laser diode 1 (the middle level).

When the laser diode 1 is caused to generate the amorphous-phase forming level Pp, the current Ip from the Ip current source 5 is added to the current (Ir+Ie) for causing the laser diode 1 to generate laser power having the crystallizing level Pe, and, thus, the current Ip and the current (Ir+Ie) are caused to flow through the laser diode 1 together.

In this case, the Ie switch 6 and the Ip switch 4 are operated. When both the Ie switch 6 and the Ip switch 4 are turned on, the current Ie from the Ie current source 7 and the current Ip from the Ip current source 5 are added to the current Ir from the Ir current source 8. As a result, the current (Ir+Ie+Ip) is caused to flow through the laser diode 1.

When both the Ie switch 6 and the Ip switch 4 are turned off, only the current Ir from the Ir current source 8 is caused to flow through the laser diode 1.

Thus, when the laser diode 1 is caused to generate laser power having the amorphous-phase forming level Pp, the pulse current Ie' generated as a result of the Ie switch 6 being turned on and off and the pulse current Ip' generated as a result of the Ip switch 4 being turned on and off are added to the current Ir which causes the laser diode 1 to generate laser power having the reading level Pr. Thus, the current (Ir+Ie'+Ip') is caused to flow through the laser diode 1 (the highest level).

The operations performed by the first embodiment will now be described with reference to a timing chart shown in FIG. 3.

Figure 3:
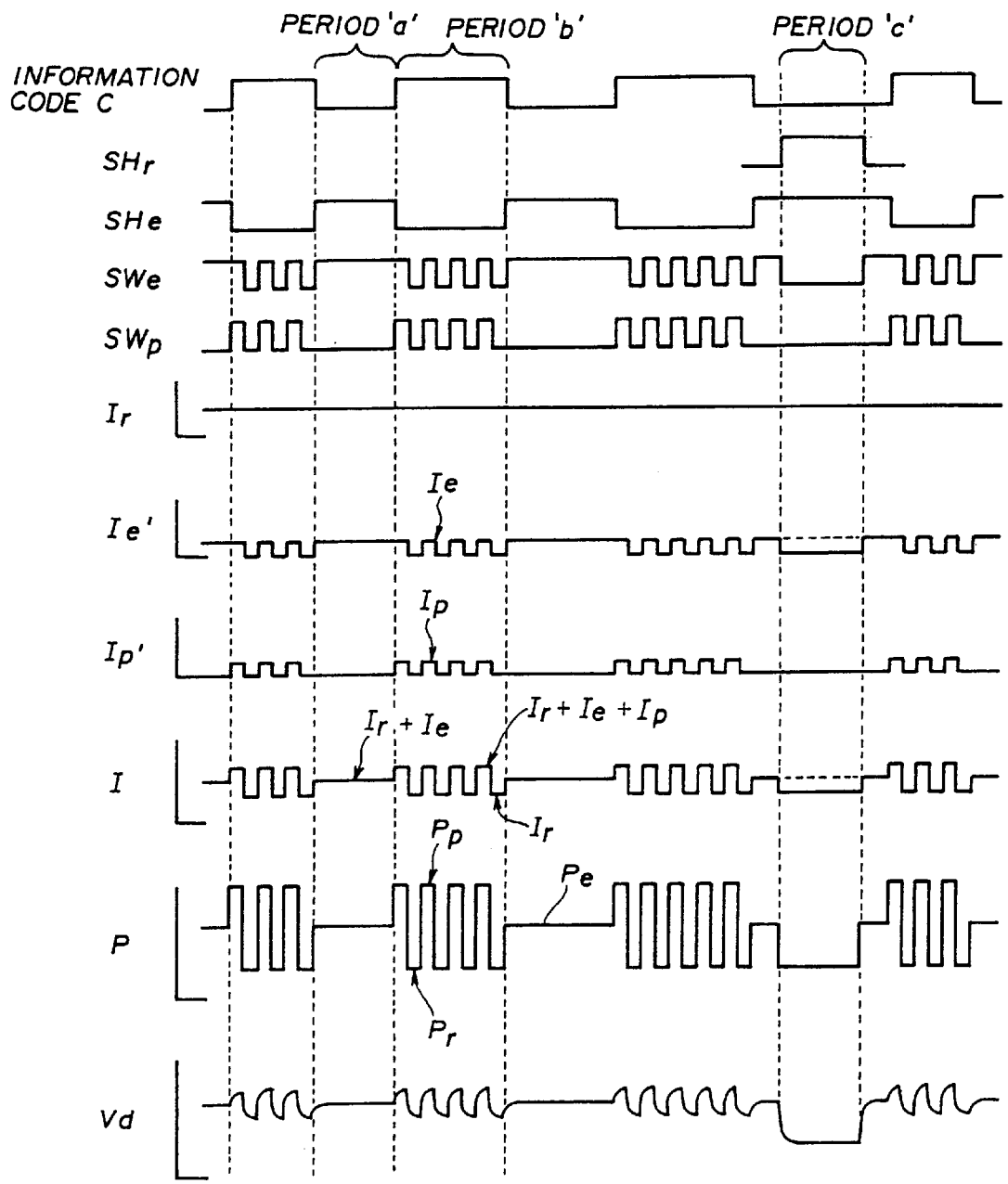
FIG. 3 shows a timing chart illustrating operations performed by the optical disk drive shown in FIG. 2.

FIG. 3 shows the timing chart illustrating the operations performed by the optical disk drive shown in FIG. 2. The symbols shown in FIG. 3 given to respective waveforms are the same as those shown in FIG. 2. The waveform P shown in FIG. 3 is a waveform of laser power generated by the laser diode 1 as a result of the current I flowing through the laser diode 1. Each period 'a' is a period during which an information code C is in a '0' level. Each period 'b' is a period during which the information code C is in a '1' level. The period 'c' is a period during which the sampling timing signal SHr is in the 'H' level.

First, control of the laser power (P in FIG. 3) in the crystallizing level Pe corresponding to the '0' level of the information code, and control of the laser power having the amorphous-phase forming level Pp (control of the laser power by which the level changes between the amorphous-phase forming level Pp and the reading level Pr alternately so that waveforms of pulse series are generated) will now be described.

In the laser-power control device shown in FIG. 2, recording data undergoes predetermined data modulation through the encoder 26 so as to be converted into the information code (recording code) C.

As a method of the data modulation, for the phase-change-type optical disk such as the CD-RW, EFM modulation is used generally.

The first pulse generator 22 and the second pulse generator 23 perform on-off operations in accordance with the level of the information code C.

Through the on-off operations of the first and second pulse generators 22 and 23, the on-off control signal SWe for the Ie switch 6 and the on-off control signal SWp for the Ip switch 4 are generated. The first AND gate circuit 19 and the second AND gate circuit 20 are connected at the output terminals of the first pulse generator 22 and the second pulse generator 23, respectively.

The output of the first pulse generator 22 is input to one input terminal of the first AND gate circuit 19. The output of the second pulse generator 23 is input to one input terminal of the second AND gate circuit 20.

A signal in the 'H' level is usually input to the other input terminals of the first AND gate circuit 19 and the second AND gate circuit 20 through the inverter 21.

Thereby, usually, the outputs of the first pulse generator 22 and the second pulse generator 23 are provided as the two on-off control signals, that is, the on-off control signal SWe for the Ie switch 6 and the on-off control signal SWp for the Ip switch 4, as they are, through the first AND gate circuit 19 and the second AND gate circuit 90, respectively.

In each period (each period 'a' in FIG. 3) in which the information code C is in the '0' level, the control signal SWe output from the first pulse generator 22 is in the 'H' level, and the control signal SWp output from the second pulse generator 23 is in the 'L' level.

Thereby, only the Ie switch 6 is in the turned-on condition, and, as the current I to be caused to flow through the laser diode 1, the total of the current Ir from the Ir current source 8 and the current Ie from the Ie current source 7, that is, the current (Ir+Ie) is provided.

As a result, the laser power (emitted power) P of the laser diode 1 is in the crystallizing level Pe.

In each period (each period 'b' in FIG. 3) during which the information code C is in the '1' level, the levels of the outputs of the first pulse generator 22 and the second pulse generator 23 change, so that waveforms of pulse series are generated, in the same timing.

Thereby, in this case, the levels of the two on-off control signals change, so that waveforms of pulse series are generated, in the same timing. As a result, the Ie switch 6 and the Ip switch 4 perform on-off operations, so that waveforms of pulse series are generated, in the same timing.

Thus, during each period 'b', the current Ir flows through the laser diode 1 when both the switches 6 and 4 are in the turned-off condition, and, the current (Ir+Ie+Ip) flows through the laser diode 1 when both the switches 6 and 4 are in the turned-on condition.

As a result, the laser power (emitted power) of the laser diode 1 is changed between the reading level Pr and the amorphous-phase forming level Pp so that a waveform of pulse series is generated.

Thus, in the laser-power control device shown in FIG. 2, the laser power (P in FIG. 3) is controlled to be the crystallizing level Pe for the '0' level of the information code. The laser power is controlled to be changed between the amorphous-phase forming level Pp and the reading level Pr, so that a waveform of pulse series is generated, for the '1' level of the information code.

The emitted-light-intensity detection voltage Vd output from the amplifier 3 has a value corresponding to the laser power P. However, because the photo detector 2 and the amplifier 3 have relatively narrow response frequency bands, precise light-intensity detection cannot be performed during each period (each period 'b') during which the information code C is in the '1' level and the intensity of emitted light changes so that a waveform of pulse series is generated.

During each period (each period 'a') during which the information code C is in the '0' level, because the laser power P is in the crystallizing level Pe and a waveform of pulse series is not generated, the emitted-light-intensity detection voltage Vd output from the amplifier 3 has a value corresponding to the crystallizing level Pe, as shown in FIG. 3.

In the first embodiment of the present invention, in order to enable precise adjustment of the reading level Pr of the reading level Pr and the amorphous-phase forming level Pp between which the laser power is changed so that a waveform of pulse series is generated during each period (each period 'b') during which the information code C is in '1' level, the timing signal SHr is caused to be in the 'H' level. The 'H' level of the timing signal SHr causes both the on-off control signal SWe for the Ie switch 6 and the on-off control signal SWp for the Ip switch 4 to be in the 'L' level. During the period (the period 'c') during which the timing signal SHr is in the 'H' level, the emitted-light-intensity detection voltage Vd output from the amplifier 3 is held by the first sample-and-hold circuit 17.

Further, the emitted-light-intensity detection voltage Vd output from the amplifier 3 is held by the second sample-and-hold circuit 18 during the period (the period 'a') during which the on-off control signal SWe for the Ie switch 6 is in the 'H'level, and the on-off control signal SWp for the Ip switch 4 is in the 'L' level.

The current Ir from the Ir current source 8 is adjusted, by using the output of the first sample-and-hold circuit 17, through the first comparator 13, the micro controller 12 and the first D-A converter 9.

The current Ie from the Ie current source 7 is adjusted, by using the output of the second sample-and-hold circuit 18, through the second comparator 14, the micro controller 12 and the second D-A converter 10, and, also, the current Ip from the Ip current source 5 is adjusted, by using the output of the second sample-and-hold circuit 18, through the second comparator 14, the micro controller 12 and the third D-A converter 11.

Adjusting operations for the respective currents Ir, Ie and Ip will be described later in detail in descriptions of second, third, fourth and fifth embodiments.

In the first embodiment, as a result of having the above-described arrangement, it is possible to stabilize emitted-light intensity even when the emitted-light-intensity detector having a relatively narrow detection frequency band and being inexpensive is used. As a result, it is possible to provide an optical disk drive in which information recorded on a disk has high reliability.

A second embodiment of the present invention will now be described. In the second embodiment, arrangements for adjusting the current Ir for the reading level Pr and the current Ie for the crystallizing level Pe are specified in the optical disk drive described in the description of the first embodiment.

A hardware arrangement of the second embodiment is the same as that of the first embodiment shown in FIG. 2. The timing chart of operations of the second embodiment is basically the same as that of the first embodiment shown in FIG. 3.

Generally, in the optical disk drive shown in FIG. 2, the first comparator 13, micro controller 12 and first D-A converter 9 (a first adjusting unit) compare the predetermined voltage Tr output from the fifth D-A with converter 16 with the output level of the first sample-and-hold circuit 17, and increase or decrease the current-Ir for the reading level Pr based on the comparison result. The second comparator 14, micro controller 12 and second D-A converter 10 (a second adjusting unit) compare the predetermined voltage Te output from the fourth D-A converter 15 with the output level of the second sample-and-hold circuit 18, and increase or decrease the current Ie for the reading level Pe based on the comparison result.

The signal SHe shown in FIG. 3 is the sampling timing signal, the level of which is 'H' during each period (each period 'a' in the figure) during which the information code C is in the '0' level.

The second timing circuit 25 outputs the sample timing signal SHe, the level of which is 'H' during each period (each period 'a' in the figure) during which the information code C is in the '0' level.

The second sample-and-hold circuit 18 samples the emitted-light-intensity detection voltage Vd during each period during which the level of the sampling timing signal SHe is 'H'.

As a result, the output of the second sample-and-hold circuit 18 is always the detection voltage corresponding to the crystallizing level Pe.

The micro controller 12 previously inputs the predetermined voltage Te, which is equal to the detection voltage detected when the laser power is in a desired crystallizing level, to one input terminal of the second comparator 14 via the fourth D-A converter 15.

The second comparator 14 compares the level of the output of the second sample-and-hold circuit 18 with the level of the above-mentioned predetermined voltage Te. The second comparator 14 generates output in the 'H' level when them level of the output of the second sample-and-hold circuit 18 is lower than the level of the above-mentioned predetermined voltage Te. The second comparator 14 generates output in the 'L' level when the level of the output of the second sample-and-hold circuit 18 is higher than the level of the above-mentioned predetermined voltage Te.

The micro controller 12 reads the output of the second comparator 14. When the output of the second comparator 14 is in the 'H' level, the micro controller 12 increases the set level of the second D-A converter 10. As a result, the Ie current source 7 increases the current I which flows through the laser diode 1.

When the output of the second comparator 14 is in the 'L' level, the micro controller 12 decreases the set level of the second D-A converter 10. As a result, the Ie current source 7 decreases the current I which flows through the laser diode 1.

Through such control by the micro controller 12, reading of the output of the second comparator 14 and setting of the second D-A converter 10 based on the result of the reading of the output of the second comparator 14 are repeated every predetermined time (for example, every 10 milliseconds).

Thus, the current I flowing through the laser diode 1 is controlled, and, thereby, the crystallizing level Pe of the laser power is adjusted to be the desired level.

However, as mentioned above, because the response frequency bands of the photo detector 2 and the amplifier 3 are relatively narrow, it is not possible to perform precise emitted-light-intensity detection during each period (each period 'b' in FIG. 3) during which the level of the information code C is '1' and the emitted light has a waveform of pulse series.

As a result, during each period 'b' during which the level of the information code C is '1', the emitted-light-intensity detection voltage Vd output from the amplifier 3 is not the detection level corresponding to the reading level Pr or the amorphous-phase forming level Pp.

Therefore, in the second embodiment, the micro controller 12 outputs a sampling request signal to the first timing circuit 24 every predetermined time (for example, every 1 second).

When receiving the sampling request signal, the first timing circuit 24 causes the sampling timing signal SHr to be in the 'H' level for a predetermined period.

As shown in FIG. 3, the level of the sampling timing signal SHr is 'H' during the period 'c'.

The sampling timing signal SHr output from the first timing circuit 24 passes through the inverter 21, and, then, is input to the other input terminals of the first AND gate circuit 19 and the second AND gate circuit 20.

Therefore, when the level of the sampling timing signal SHr is 'H' during the period 'c', regardless of the level of the information code C, both the on-off control signals SWe and SWp are in the 'L' level.

As a result, both the Ie switch 6 and Ip switch 4 are in the turned-off condition, and, only the current Ir flows through the laser diode 1. As a result, the laser power (emitted-light level) P is in the reading level Pr.

The sampling timing signal SHr output from the first timing circuit 24 is also input to the first sample-and-hold circuit 17.

The first sample-and-hold circuit 17 samples the emitted-light-intensity detection voltage Vd during the period during which the level of the sampling timing signal SHr is 'H'.

In this case, the output of the first sample-and-hold circuit 17 is the detection signal corresponding to the reading level Pr.

Every predetermined time, the sampling timing signal SHr is caused to be in the 'H' level during the period 'c'. Thereby, as described above, the emitted-light level of the laser diode 1 is caused to be in the reading level Pr so that a waveform of pulse series is not generated, and the emittedlight-intensity detection voltage Vd is sampled, during each period 'c'. As a result, it is possible to detect the reading level Pr.

In detail, the micro controller 12 previously inputs the predetermined voltage Tr, which is equal to the detection voltage detected when the laser power is in a desired reading level Pr, to one input terminal of the first comparator 13 via the fifth D-A converter 16.

The first comparator 13 compares the level of the output of the first sample-and-hold circuit 17 with the level of the above-mentioned predetermined voltage Tr. When the level of the output of the first sample-and-hold circuit 17 is lower than the level of the above-mentioned predetermined voltage Tr, the first comparator 13 outputs the 'H' level. When the level of the output of the first sample-and-hold circuit 17 is higher than the level of the above-mentioned predetermined voltage Tr, the first comparator 13 outputs the 'L' level.

The micro controller 12 outputs the sampling request signal, and, after the emitted-light-intensity detection voltage Vd output from the amplifier 3 is sampled by the first sample-and-hold circuit 17, the micro controller 12 reads the output of the first comparator 13. When the output of the first comparator 13 is in the 'H' level, the micro controller 12 increases the set value of the first D-A converter 9 so that the Ir current source 8 increases the current I flowing through the laser diode 1.

When the output of the first comparator 13 is in the 'L' level, the micro controller 12 decreases the set value of the first D-A converter 9 so that the Ir current source 8 decreases the current I flowing through the laser diode 1.

Through such control by the micro controller 12, outputting of the sampling request signal, reading of the output of the first comparator 13, and setting of the first D-A converter 9 based on the result of the reading of the output of the first comparator 13 are repeated every predetermined time (for example, every 10 milliseconds).

Thus, the current I flowing through the laser diode 1 is controlled, and the reading level Pr of the laser power is adjusted to be in the desired level.

A third embodiment of the present invention will now be described.

In the description of the second embodiment, the specific arrangements for adjusting the current Ir for the reading level Pr and the current Ie for the crystallizing level Pe have been described.

In the third embodiment, an arrangement for adjusting the current Ip for the amorphous-phase forming level Pp is specified.

A hardware arrangement of the third embodiment is the same as that of the first embodiment shown in FIG. 2. The timing chart of operations of the third embodiment is basically the same as that of the first embodiment shown in FIG. 3.

The signal SHr shown in FIG. 3 is the sampling timing signal SHr which is in the 'H' level during the period 'c'.

As described in the description of the second embodiment, the micro controller 12 reads the output of the second comparator 14, and, based on the result of reading the output of the second comparator 14, the micro controller 12 performs setting of the second D-A converter 10 every predetermined time (for example, every 10 milliseconds). Thus, the micro controller 12 adjusts the crystallizing level Pe of the laser power to be a desired level.

Further, the micro controller 12 sets a set value of the third D-A converter 11, which set value is obtained as a result of the set value of the second D-A converter being multiplied by a predetermined coefficient.

As a result, when the laser diode 1 is caused to generate the amorphous-phase forming level Pp, the current Ip which the Ip current source 5 causes to flow through the laser diode 1 has the value obtained as a result of the value of the current Ie which the Ie current source 7 causes to flow through the laser diode 1 being multiplied by the predetermined coefficient.

Figure 4:
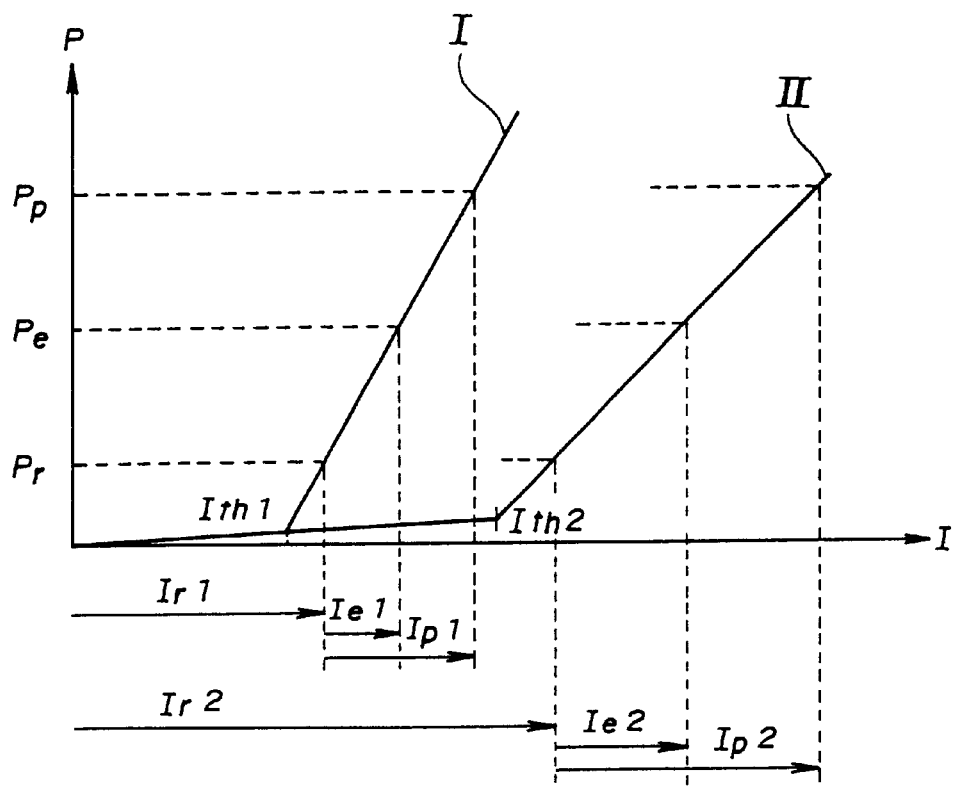
FIG. 4 shows a characteristic diagram showing relations between a current flowing through a laser diode and laser power according to the third embodiment in the optical disk drive shown in FIG. 2.

FIG. 4 shows a characteristic diagram showing relations between the current I flowing through the laser diode 1 and the laser power P according to the third embodiment in the optical disk drive shown in FIG. 2. In the graph shown in FIG. 4, the horizontal axis is the axis of the current I flowing through the laser diode 1, and the vertical axis is the axis of the laser power P. The curves 'I' and 'II' are different characteristic curves, and the values Ith1 and Ith2 are threshold values of the currents.

As shown in FIG. 4, the characteristics of the current I flowing through the laser diode 1 and the laser power P vary, under the influence of the ambient temperature and so forth, between the characteristic curves 'I' and 'II', for example.

However, in the ranges larger than the threshold values Ith1 and Ith2, the characteristic curves 'I' and 'II' are linear.

Therefore, when the characteristic curve varies, the current Ir for the reading level Ir and the current Ie for the crystallizing level Pe are adjusted, as described above in the description of the second embodiment, so that the fixed power levels Pr and Pe are obtained. Further, the current Ip for the amorphous-phase forming level Pp is adjusted so that the current Ip for the amorphous-phase forming level Pp is obtained as a result of the current Ie for the crystallizing level Pe being multiplied by the fixed coefficient. As a result, even though the slope of the characteristic curve varies, when the current (Ir+Ie+Ip) is caused to flow through the laser diode 1, the fixed level Pp of the laser power can be obtained.

Thus, in the third embodiment, the ratio between the current Ip for the amorphous-phase forming level Pp and the current Ie for the crystallizing level Pe is previously set to a value such that a desired amorphous-phase forming level Pp can be obtained by using the thus-set value.

As a result, the desired amorphous-phase forming level Pp can be obtained.

Figure 5:
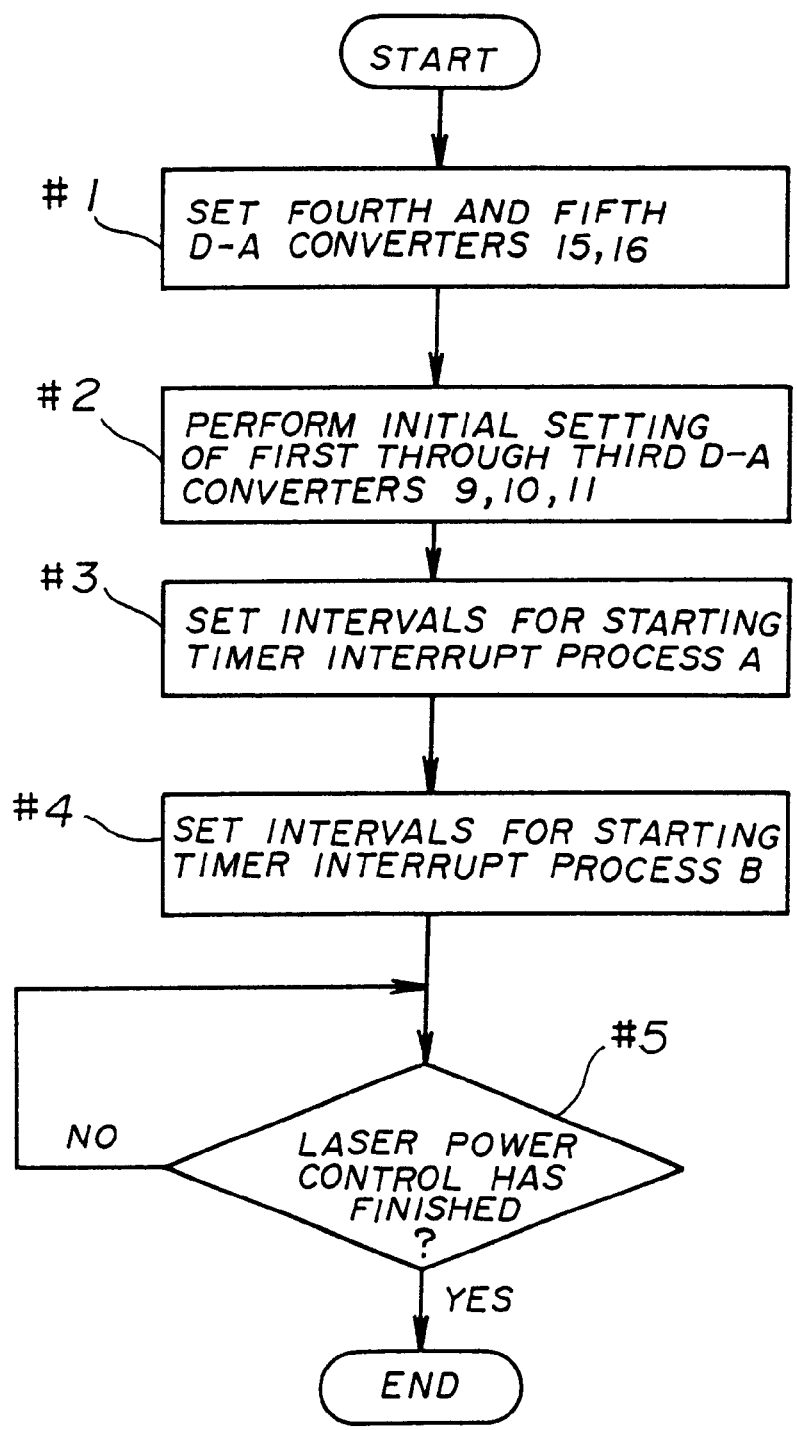
FIG. 5 shows a flowchart showing an essential operation flow in laser-power control in the optical disk drive in the third embodiment according to the present invention.

FIG. 5 shows a flowchart showing an essential operation flow in laser-power control in the optical disk drive in the third embodiment according to the present invention.

This laser-power control is performed by the micro controller 12 shown in FIG. 2.

In a step #1, initial setting of the fourth D-A converter 15 and the fifth D-A converter 16, which generate predetermined voltages corresponding to desired crystallizing level Pe and reading level Pr of the laser power, respectively, is performed.

In the fourth and fifth D-A converters 15 and 16, data is set such that the output voltages thereof are the predetermined voltages Te and Tr as described above.

In a step #2, initial setting of the first, second and third D-A converters 9, 10 and 11, which are used for adjusting the currents Ir, Ie and Ip of the current sources 8, 7 and 5, respectively, is performed. Each initial value to be set in the respective one of the first, second and third D-A converters 9, 10 and 11 is, for example, '0' or the like.

Figure 6:
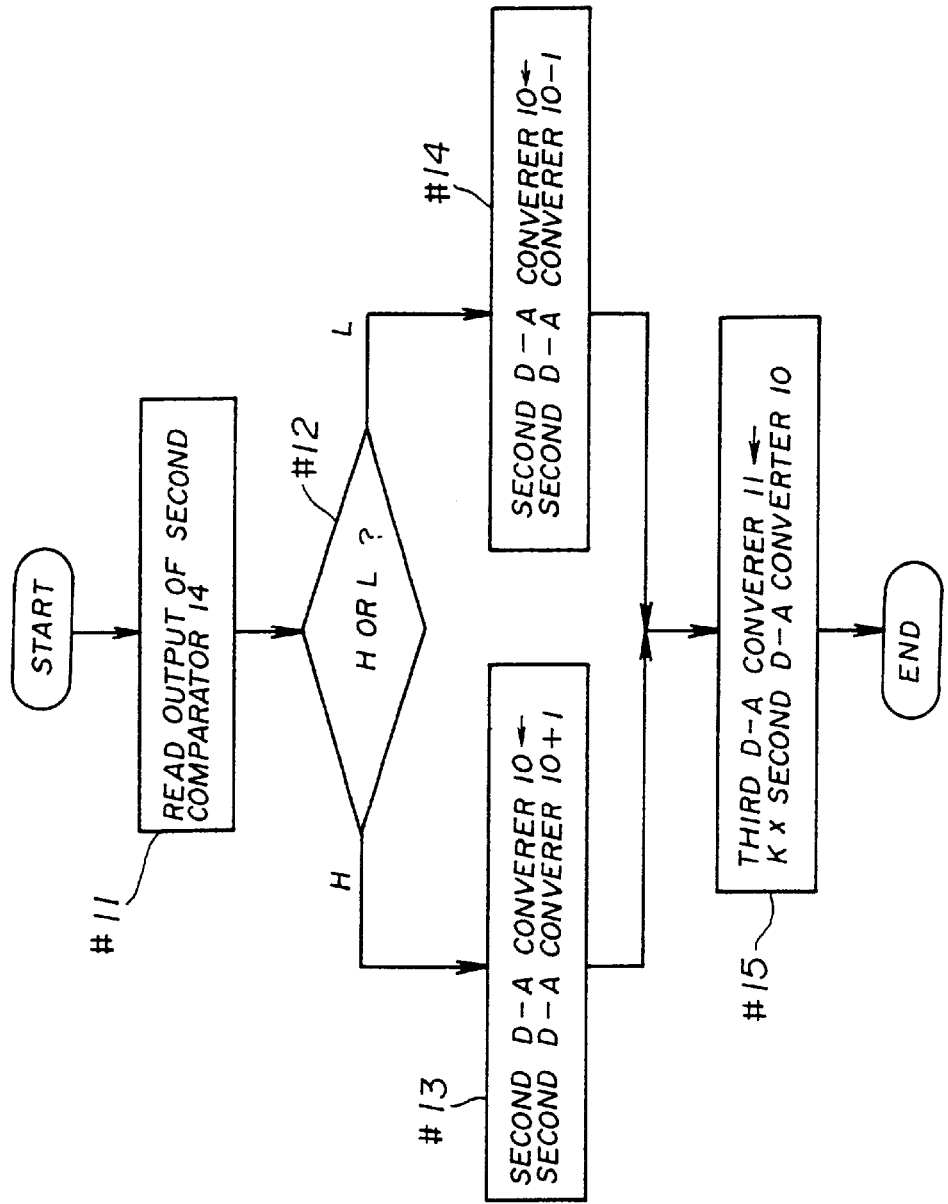
FIG. 6 shows a flowchart of a timer interrupt process A shown in FIG. 5.

In a step #3, intervals at which a timer interrupt process A shown in FIG. 6 is started are set. In the timer interrupt process A, adjustment of the currents Ie and Ip is performed.

Each of the intervals at which this interrupt process A is started is set to, for example, 10 milliseconds. Thereby, a timer interrupt occurs every 10 milliseconds, and the timer interrupt process A is started every time when the timer interrupt occurs.

Figure 7:
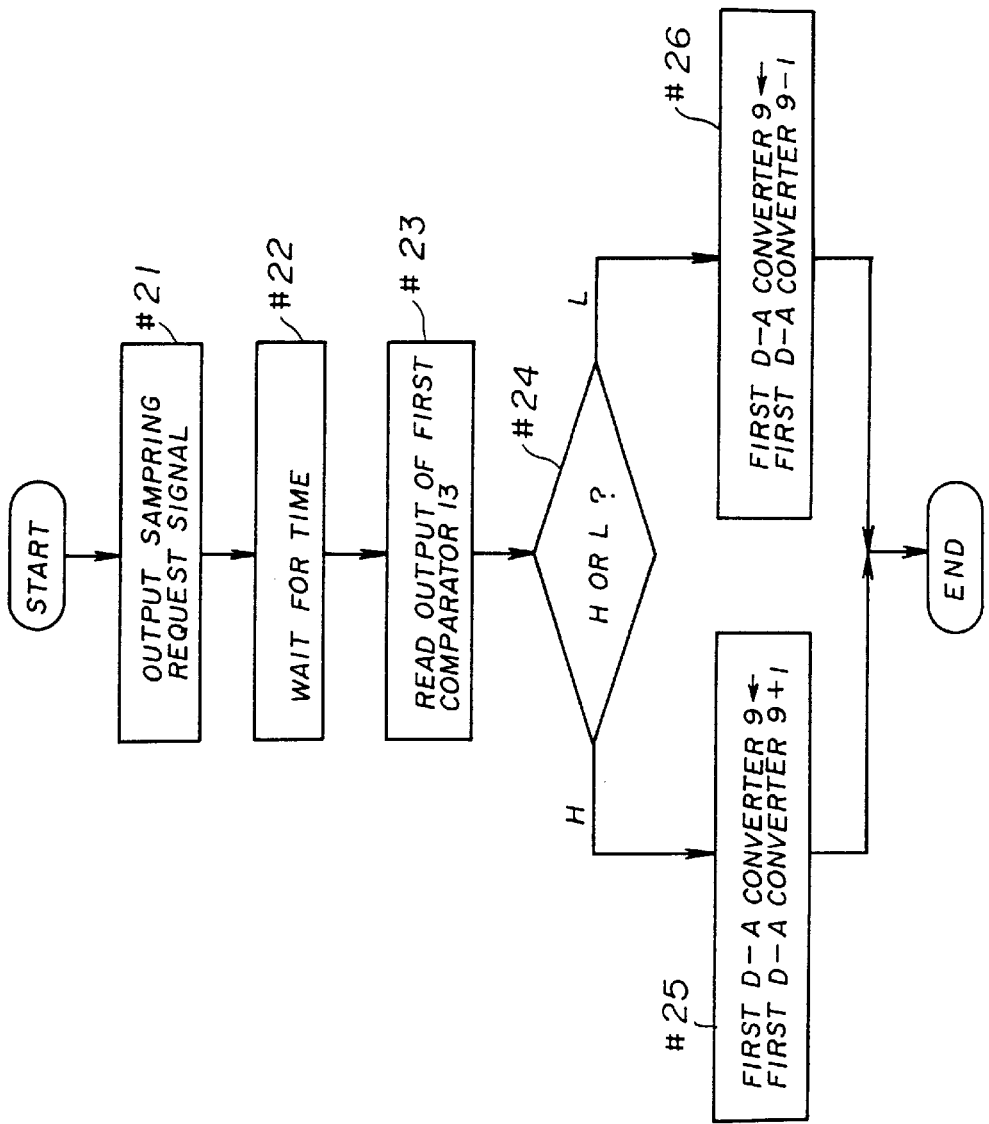
FIG. 7 shows the flowchart of the timer interrupt process B shown in FIG. 5.

In a step #4, intervals at which a timer interrupt process B shown in FIG. 7 is started are set.

Each of the intervals at which this interrupt process B is started is set to, for example, 1 second. Thereby, a timer interrupt occurs every 1 second, and the timer interrupt process B is started every time when the timer interrupt occurs.

In a step #5, it is determined whether or not the laser power control is to continue.

This determination in the step #5 is repeated again and again until the operation flow shown in FIG. 5 is ended. Actually, during the repetitions of the step #5, the timer interrupt processes A and B are started every set times.

The timer interrupt process A for adjusting the current Ie and the current Ip will now be described with reference to a flowchart shown in FIG. 6.

FIG. 6 shows the flowchart of the timer interrupt process A shown in FIG. 5.

When the timer interrupt process A is started, in a step #11, the output of the second comparator 14 is read.

As described above, the output of the second comparator 14 is in-the 'H' level when the crystallizing level Pe is lower than the predetermined level, and the output of the second comparator 14 is in the 'L' level when the crystallizing level Pe is higher than the predetermined level.

In a step #12, it is determined whether the output of the second comparator 14 is in the 'H' level or the 'L' level. When it is determined in the step #12 that the output of the second comparator 14 is in the 'H' level, a step #13 is performed. In the step #13, the set value of the second D-A converter 10, which is used for adjusting the value of the current of the Ie current source 7, is updated.

In the step #13, the value obtained as a result of '1' being added to the set value of the second D-A converter 10, previously set, is newly set in the second D-A converter 10, as the updated set value. As a result, the current Ie increases, and, thereby, the crystallizing level Pe increases.

When it is determined in the step #12 that the output of the second comparator 14 is in the 'L' level, a step #14 is performed. In the step #14, the set value of the second D-A converter 10, which is used for adjusting the value of the current of the Ie current source 7, is updated.

In the step #14, the value obtained as a result of '1' being subtracted from the set value of the second D-A converter 10, previously set, is newly set in the second D-A converter 10, as the updated set value. As a result, the current Ie decreases, and, thereby, the crystallizing level Pe decreases.

In a step #15, the set value of the third D-A converter 11, which is used for adjusting the value of the current of the Ip current source 5, is updated.

In the third D-A converter 11, the value obtained as a result of the value set in the second D-A converter 10 in the step #13 or #14 being multiplied by the predetermined coefficient K is set.

As a result of previously determining the coefficient K to be the value such that the desired amorphous-phase forming level Pp can be obtained by using the thus-set value, the desired amorphous-phase forming level Pp can be obtained.

Through the steps #11 through #15, the current Ie for the crystallizing level Pe and the current Ip for the amorphous-phase forming level Pp are adjusted to be the desired values, respectively. Thereby, the desired crystallizing level Pe and amorphous-phase forming level Pp of the laser power can be obtained.

The timer interrupt process B for adjusting the current Ir will now be described with reference to a flowchart shown in FIG. 7.

FIG. 7 shows the flowchart of the timer interrupt process B shown in FIG. 5.

When the timer interrupt process B is started, in a step #21, the micro controller 12 outputs the sampling request signal to the first timing circuit 24.

In a step #22, the first timing circuit 24 causes the sampling timing signal SHr to be in the 'H' level. Then, the micro controller 12 waits until a predetermined time elapsed so that the first sample-and-hold circuit 17 samples the emitted-light-intensity detection voltage Vd.

In a step #23, the output of the first comparator 13 is read.

As described above, the output of the first comparator 13 is in the 'H' level when the reading level Pr is lower than the predetermined level. The output of the first comparator 13 is in the 'L' level when the reading level Pr is higher than the predetermined level.

In a step #24, it is determined whether the output of the first comparator 13 is in the 'H' level or the 'L' level. When it is determined in the step #24 that the output of the first comparator 13 is in the 'H' level, a step #25 is performed. In the step #25, the set value of the first D-A converter 9, which is used for adjusting the value of the current of the Ir current source 8, is updated.

In the step #25, the value obtained as a result of '1' being added to the set value of the first D-A converter 9, previously set, is newly set in the first D-A converter 9, as the updated set value. As a result, the current Ir increases, and, thereby, the reading level Pr increases.

When it is determined in the step #24 that the output of the first comparator 13 is in the 'L' level, a step #26 is performed. In the step #26, the set value of the first D-A converter 9, which is used for adjusting the value of the current of the Ir current source 8, is updated.

In the step #26, the value obtained as a result of '1' being subtracted from the set value of the first D-A converter 9, previously set, is newly set in the first D-A converter 9, as the updated set value. As a result, the current Ir decreases, and, thereby, the reading level Pr decreases.

Thus, in the third embodiment, direct detection of the laser power having the amorphous-phase forming level Pp is not performed. However, control is performed such that the current Ip obtained as a result of the adjusted current Ie being multiplied by the predetermined coefficient (for example, the coefficient K) is provided. Thereby, it is possible to precisely adjust the amorphous-phase forming level Pp to be a desired level. As a result, it is possible to provide an optical disk drive in which information recorded on a disk has high reliability.

A fourth embodiment of the present invention will now be described.

In the fourth embodiment, the second sample-and-hold circuit 18 samples the emitted-light-intensity detection voltage Vd output from the amplifier 3 during a period, during which the on-off control signal SWe for the Ie switch 6 is in the 'H' level and the on-off control signal SWp for the Ip switch 4 is in the 'L' level, which period is longer than a predetermined time, in the optical disk drive described in the description of the first embodiment.

A hardware arrangement of the fourth embodiment is the same as that of the first embodiment shown in FIG. 2. The timing chart of operations of the fourth embodiment is basically the same as that of the first embodiment shown in FIG. 3.

The second timing circuit 25 shown in FIG. 2 causes the sample timing signal SHe to be in the 'H' level only when a period (period 'a' shown in FIG. 3) during which the information code C is in the '0' level is longer than the predetermined time.

Figure 8:
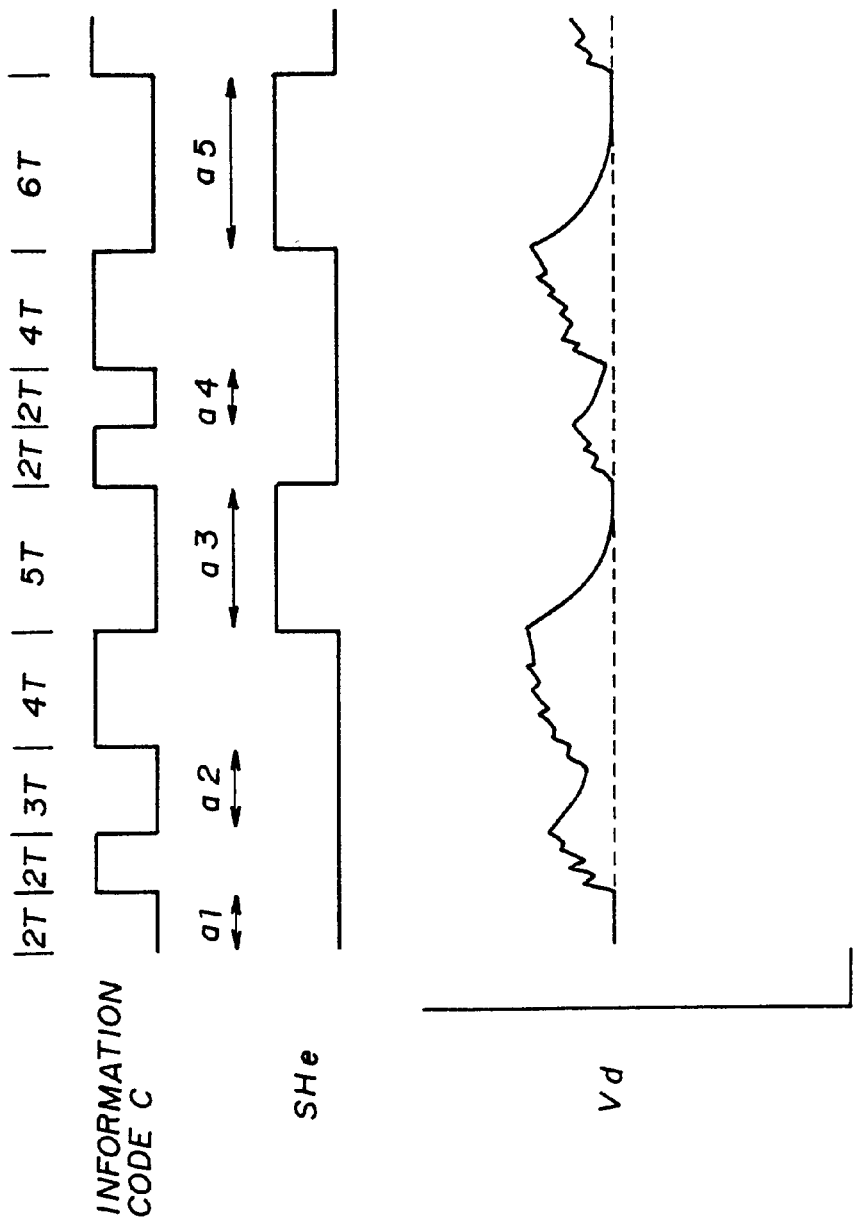
FIG. 8 shows a timing chart illustrating an operation performed by a second timing circuit according to the fourth embodiment in the optical disk device shown in FIG. 2.

FIG. 8 shows a timing chart illustrating the operation of the second timing circuit 25 according to the fourth embodiment in the optical disk device shown in FIG. 2. The symbols shown in FIG. 8 given to respective waveforms are the same as those shown in FIG. 3. As shown in FIG. 8, the information code C is in the '0' level during periods a1, a2, a3, a4 and a5.

FIG. 8 shows a case where the second timing circuit 25 causes the sampling timing signal SHe to be in the 'H' level each time when a period during which the information code C is in the '0' level is equal to or longer than 5T (where 'T' represents a predetermined unit time).

In the case of FIG. 8, the information code C is in the '0' level during the five periods a1, a2, a3, a4 and a5, as mentioned above. Among these periods, each of the periods a3 (5T) and a5 (6T) is equal to or longer than 5T.

Accordingly, the sampling timing signal SHe is caused to be in the 'H' level during the periods a3 and a5, as shown in FIG. 8.

FIG. 8 shows the waveform of the emitted-light-intensity detection voltage Vd.

In the related art, in a case where the detection frequency bands of the photo detector 2 and the amplifier 3 are relatively narrow, even during a period during which the information code C is in the '0' level, that is, during which the laser power has the crystallizing level Pe and does not have a waveform of pulse series, when the period is short, stabilization of the emitted-light-intensity detection voltage Vd is not sufficiently performed, and, thereby, the voltage corresponding to the crystallizing level Pe may not be detected.

However, during a period during which the information code C is in the '0' level, that is, during which the laser power has the crystallizing level Pe and does not have a waveform of pulse series, when the period is sufficiently long, stabilization of the emitted-light-intensity detection voltage Vd is sufficiently performed, and, thereby, it is possible to detect the voltage corresponding to the crystallizing level Pe.

In the fourth embodiment, because the sampling timing signal SHe is in the 'H' level only in a case where a period during which the '0' level of the information code C continues is longer than the predetermined time so that the emitted-light-intensity detection voltage Vd output from the amplifier 3 sufficiently stabilizes, the second sample-and-hold circuit 18 samples the detection voltage corresponding to the crystallizing level Pe.

As a result, in the fourth embodiment, the emitted-light-intensity detection voltage Vd is sampled only during a period during which the '0' level of the information code C continues and the laser power does not have a waveform of pulse series, which period is longer than the predetermined time. That is, the sampling timing signal has the 'H' level only during a period during which the emitted-light-intensity detection voltage Vd sufficiently stabilizes. As a result, it is possible to detect the crystallizing level Pe further precisely in comparison with the case of the first embodiment.

A fifth embodiment of the present invention will now be described.

In the fifth embodiment, the second sample-and-hold circuit 18 samples the emitted-light-intensity detection voltage Vd output from the amplifier 3 only during a period, during which the on-off control signal SWe for the Ie switch 6 is in the 'H' level and the on-off control signal SWp for the Ip switch 4 is in the 'L' level, which period is corresponding to the longest inverting interval of the information code, in the optical disk drive described in the description of the first embodiment.

A hardware arrangement of the fifth embodiment is the same as that of the first embodiment shown in FIG. 2. The timing chart of operations of the fifth embodiment is basically the same as that of the first embodiment shown in FIG. 3.

The second timing circuit 25 shown in FIG. 2 causes the sample timing signal SHe to be in the 'H' level only during a period (of the periods 'a' shown in FIG. 3) during which the information code C is in the '0' level, which period is corresponding to the longest inverting interval of the information code.

Figure 9:
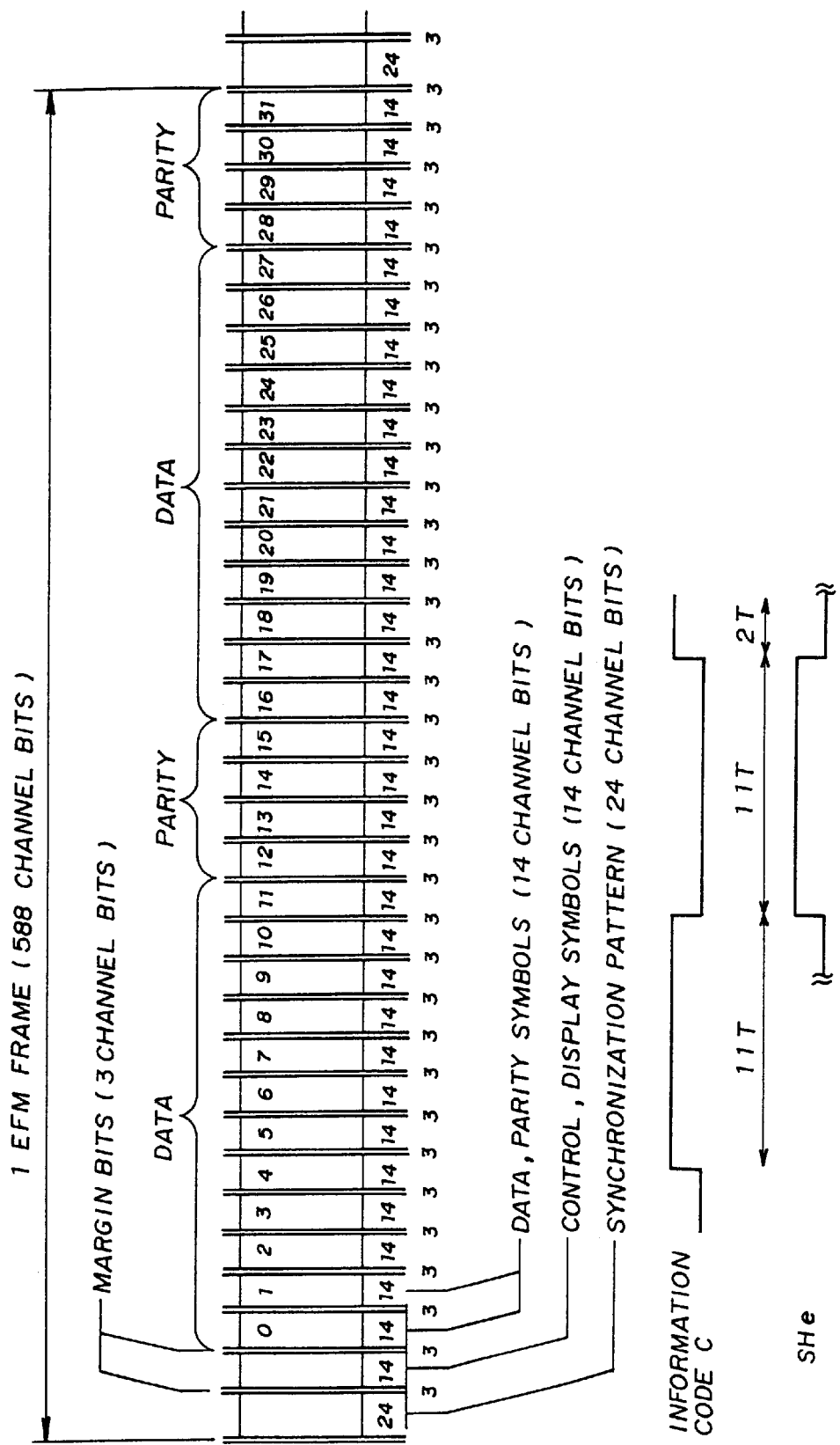
FIG. 9 shows a timing chart illustrating an operation performed by the second timing circuit according to the fifth embodiment in the optical disk device shown in FIG. 2.

FIG. 9 shows a timing chart illustrating the operation of the second timing circuit 25 according to the fifth embodiment in the optical disk drive shown in FIG. 2. The symbols shown in FIG. 9 given to respective waveforms are the same as those shown in FIG. 3.

FIG. 9 shows an EFM-frame format of a CD.

When a code obtained through EFM modulation is used as the information code (recording code), each EFM frame includes 588 channel bits.

Each EFM frame includes a synchronization pattern including 24 channel bits at the first position.

In such a format of a CD, a period during which the information code is in the '0' level, which is corresponding to the longest inverting interval, that is, 11T, inevitably appears in the synchronization pattern which is included in each EFM frame. (The longest inverting interval is the longest one of inverting intervals. Each inverting interval is an interval starting at the time when the level of the information code C changes from 'H' to 'L' and ending at the time when the level of the information code C returns to 'H'.)

In the synchronization pattern, as shown below the EFM-frame format in FIG. 9, the information code C is inverted at 11T intervals.

For the information code C, inverting intervals of shortest 3T through longest 11T are set.

The second timing circuit 25 causes the sampling timing signal SHe to be in the 'H' level only during a period during which the information code C is in the '0' level, which period is corresponding to the longest inverting interval.

In mother words, as shown in FIG. 9, the sampling timing signal SHe is in the 'H' level during the period when the inverting interval is 11T.

Because the period during which the sampling timing signal SHe is in the 'H' level is sufficiently long so that stabilization of the emitted-light-intensity detection voltage Vd is sufficiently performed, the detection voltage corresponding to the crystallizing level Pe is sampled in the period. Therefore, even in a case where the detection frequency bands of the photo detector 2 and the amplifier 3 are relatively narrow, it is possible to precisely detect the laser power having the crystallizing level Pe.

Thus, in the fifth embodiment, similar to the fourth embodiment, because the sampling timing signal SHe is in the 'H' level only during a period during which the '0' level of the information code C continues, which period is corresponding to the longest inverting interval, so that the emitted-light-intensity detection voltage Vd output from the amplifier 3 sufficiently stabilizes, the second sample-and-hold circuit 18 samples the detection voltage corresponding to the crystallizing level Pe.

As a result, in the fifth embodiment, the emitted-light-intensity detection voltage Vd is sampled only during a period during which the '0' level of the information code C continues and the laser power does not have a waveform of pulse series, which period is corresponding to the longest inverting interval. That is, the sampling timing signal is in the 'H' level through the period in which the emitted-light-intensity detection voltage Vd sufficiently stabilizes. As a result, it is possible to detect the crystallizing level Pe further precisely in comparison with the case of the first embodiment.

Further, the present invention is not limited to the above-described embodiments, and variations and modifications may be made without departing from the scope of the present invention.

The contents of the basic Japanese Patent Application No.9-365081, filed on Dec. 19, 1997, are hereby incorporated by reference.

What is claimed is:

1. An optical disk drive, provided with a light source and a light-intensity detecting unit which detects intensity of light emitted from said light source, for recording an information code on an optical disk by applying light, emitted from said light source, having a waveform of pulse series, on said optical disk, the frequency of the pulse series being higher than the frequency of the information code, said optical disk drive comprising, as a laser-power control device:

a current providing unit which provides a first current to said light source;

a first current adding unit which provides a second current to said light source in addition to the first current;

a second current adding unit which provides a third current to said light source in addition to the first current and the second current, such that said first, second and third currents are provided to said light source simultaneously;

a first switch unit which allows the second current to be provided to said light source or prevents the second current from being provided to said light source;

a second switch unit which allows the third current to be provided to said light source or prevents the third current from being provided to said light source;

a first pulse generator which provides a first on-off control signal having a waveform of pulse series to said first switch unit in accordance with the information code;

a second pulse generator which provides a second on-off control signal having a waveform of pulse series to said second switch unit in accordance with the information code;

a timing unit which generates a timing signal for preventing the first and second on-off control signal from being provided to said first switch unit and said second switch unit, respectively, during a predetermined period;

a first sample-and-hold unit which samples and holds output of said light-intensity detecting unit during the period during which the timing signal is generated;

a second sample-and-hold unit which samples and holds the output of said light-intensity detecting unit during a period during which the first on-off control signal is in a first level and the second on-off control signal is in a second level;

a first adjusting unit which adjusts the first current depending on output of said first sample-and-hold unit;

a second adjusting unit which adjusts the second current depending on output of said second sample-and-hold unit; and a third adjusting unit which adjusts the third current depending on the output of said second sample-and-hold unit.

2. The optical disk drive as claimed in claim 1, wherein:

said first adjusting unit compares the level of the output of said first sample-and-hold unit with a first predetermined level, and controls the first current depending on the comparison result; and said second adjusting unit compares the level of the output of said second sample-and-hold unit with a second predetermined level, and controls the second current depending on the comparison result.

3. The optical disk drive as claimed in claim 2, wherein said third adjusting unit controls the third current so that the third current has the value obtained as a result of the value of the second current which is controlled by said second adjusting unit being multiplied by a predetermined coefficient.

4. The optical disk drive as claimed in claim 1, wherein said second sample-and-hold unit samples and holds the output of said light-intensity detecting unit during a period during which the first on-off control signal is in the first level and the second on-off control signal is in the second level, which period is longer than a predetermined time.

5. The optical disk drive as claimed in claim 1, wherein said second sample-and-hold unit samples and holds the output of said light-intensity detecting unit during a period during which the first on-off control signal is in the first level and the second on-off control signal is in the second level, which period is corresponding to the longest inverting time of the information code.

* * * * *